INVENTOR.
FREDERICK C. ALPERS

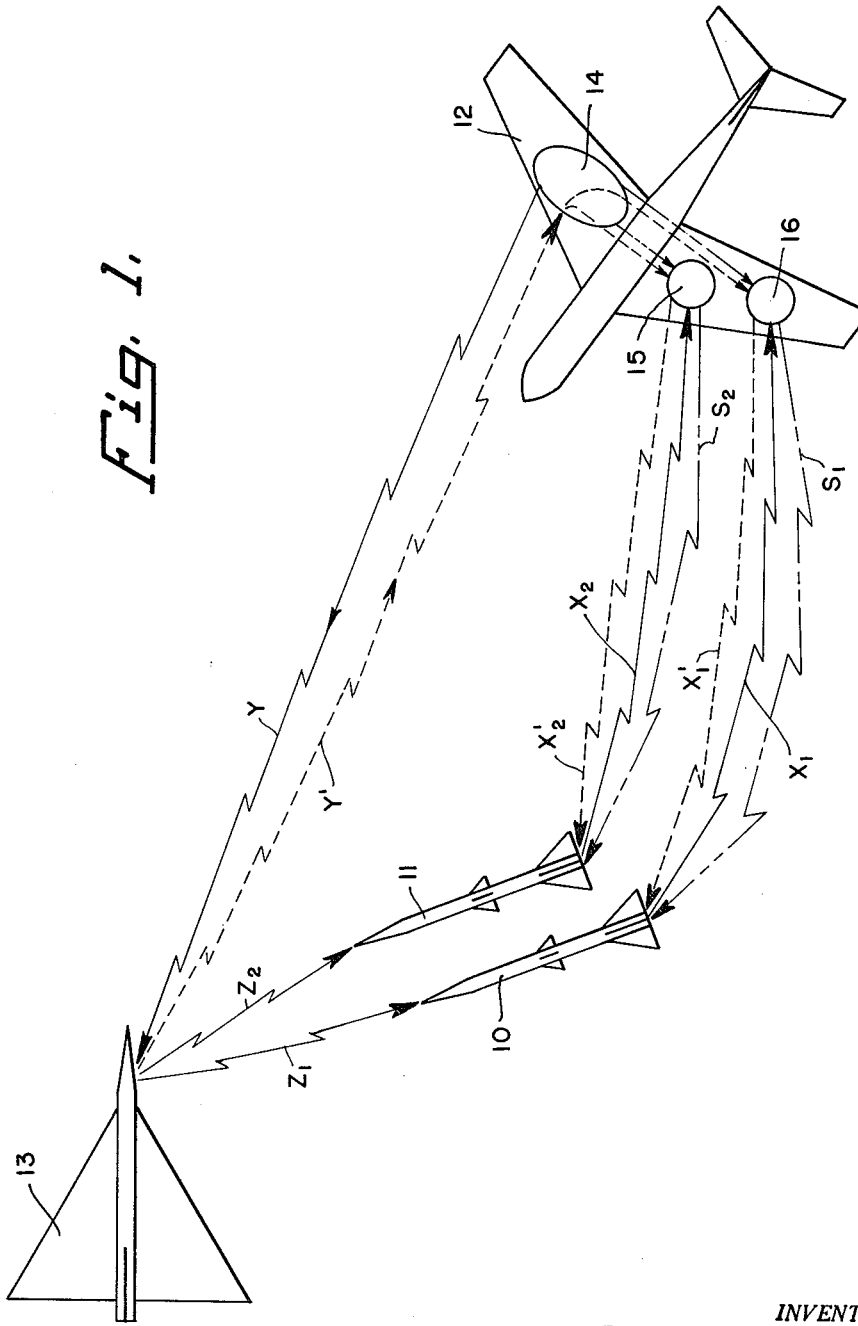

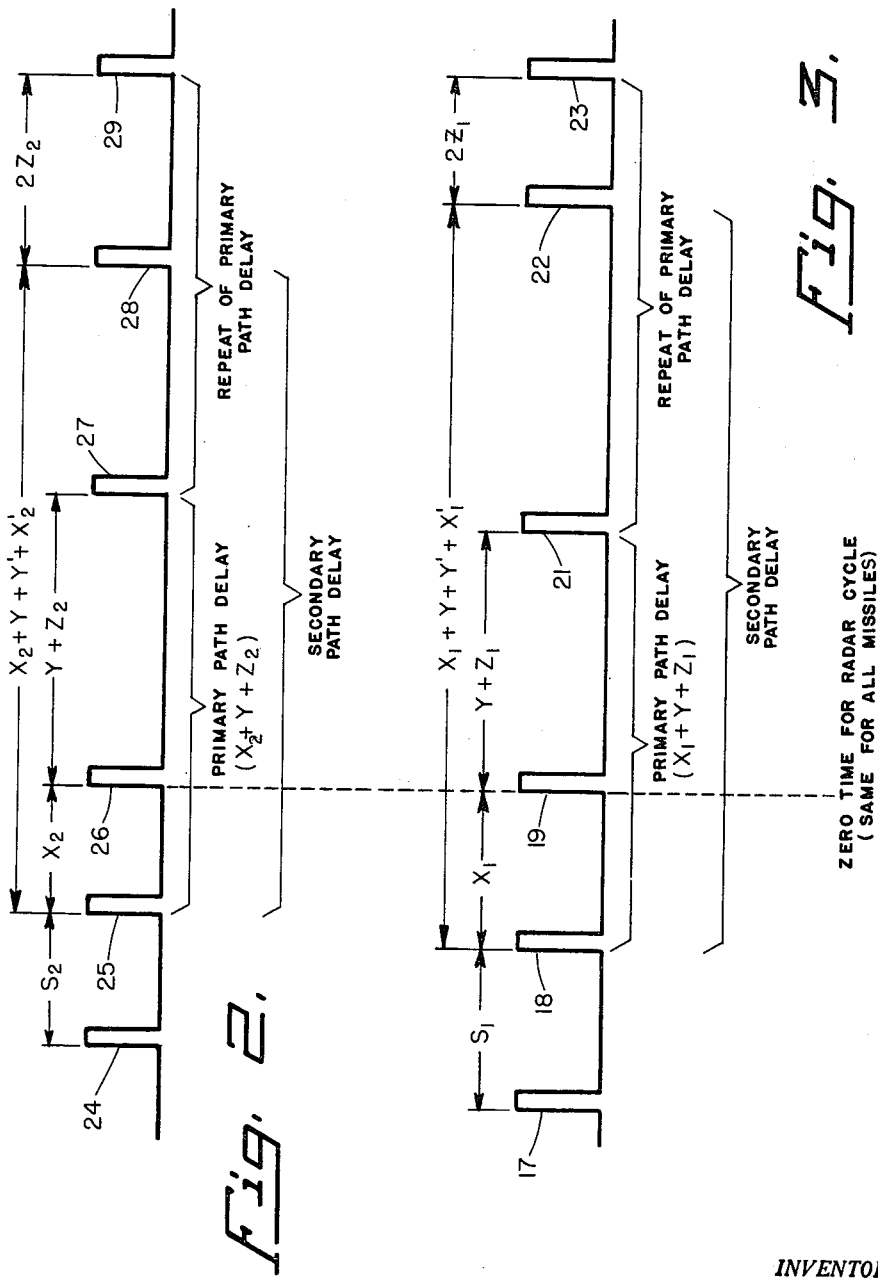

June 16, 1964 F. C. ALPERS 3,137,850
SYSTEM OF SYNCHRONIZATION AND RANGE MEASUREMENT WITH
A PLURALITY OF RADAR GUIDED MISSILES
Filed Aug. 12, 1955 4 Sheets-Sheet 4

INVENTOR.
FREDERICK C. ALPERS
BY
ATTORNEYS

United States Patent Office 3,137,850
Patented June 16, 1964

3,137,850
SYSTEM OF SYNCHRONIZATION AND RANGE MEASUREMENT WITH A PLURALITY OF RADAR GUIDED MISSILES
Frederick C. Alpers, Riverside, Calif., assignor to the United States of America as represented by the Secretary of the Navy
Filed Aug. 12, 1955, Ser. No. 528,142
5 Claims. (Cl. 343—13)
(Granted under Title 35, U.S. Code (1952), sec. 266)

The invention described herein may be manufactured and used by or for the Government of the United States of America for governmental purposes without the payment of any royalties thereon or therefor.

This invention relates to a system of synchronization and range measurement with a plurality of either semiactive or semiactive to active radar guided missiles, which provides for flying a group of missiles simultaneously with one illumination radar on the launching aircraft for the entire group.

Previous radar homing missiles which were active in character were limited in range by the size of the radar which could be carried. Previous semiactive missiles utilized the measurement of three sides to solve a triangle by the addition and subtraction of signals representing the lengths of the triangle sides involved. However, this system required the extremely accurate transmission of part of the triangle range data from the launching aircraft to the missile.

Two copending applications of F. C. Alpers for a Semiactive System of Synchronization and Range Measurement for Radar Guided Missiles, Serial No. 528,141 filed August 12, 1955, now Patent No. 2,950,477 and a System of Synchronization and Range Measurement With a Semiactive to Active Radar Guided Missile, Serial No. 528,143, filed August 12, 1955, now Patent No. 3,074,062, disclose systems wherein the missile transmits a synchronizing pulse which initiates the sequence and synchronizes the various circuit components of the missile and launching aircraft portions of the system, however, these systems are not adapted for flying a group of missiles simultaneously without a multiplication of equipment on the launching aircraft.

The present system in one preferred form of the invention consists of a semidirective radar receiver and transmitter in the tail in each of the missiles and a corresponding semidirective radar transmitter and receiver for each of the missiles in the launching aircraft, however, a single highly directive radar on the launching aircraft illuminates the target for all missiles and each of the missiles has a receiver in the nose which is capable of receiving the radar echoes from the target which are reflections of the radar pulses from the directive radar in the launching aircraft. The term semidirective refers to the transmission or reception of energy in a beam which is something less than non-directive or omnidirectional and something more than highly directive or narrow beam. The system in the missile can be of either the semiactive or the semiactive to active types disclosed in the copending applications mentioned supra, but in either case the synchronizing radar pulses traveling in either direction between each missile and the launching aircraft must be of a different frequency from radar pulses elsewhere in the system and the transmitter in the tail of the missile must be triggered by a synchronizing pulse from the launching aircraft rather than by its own oscillator during the semiactive phase of the flight. In a semiactive missile this coupling will eliminate the need for a master oscillator and a main trigger generator in the missile, and in a semiactive to active missile it would replace the master oscillator and main-trigger generator during the semiactive phase, but they would be required to trigger the true-range tracking circuit during the active phase. The illuminating radar in the launching aircraft would require a stable master oscillator and a trigger generating circuit to trigger it. The cycle for the plural missile system begins with the pulse transmitted from the illuminating radar in the launching aircraft. This pulse would be repeated at an even stable repetition frequency in order that the delays begun in one cycle might be carried over to the beginning of the next, without encountering jitter problems. After a suitable delay following the illuminating radar pulse each semidirective radar in the launching aircraft will transmit a synchronizing pulse to the receiver in the tail of the corresponding missile. This receiver would then trigger the transmitter in the tail of that missile sending a signal back to the semidirective radar in the launching aircraft in the manner of a transponder. The returning signal from the missile will be tracked by a semidirective radar receiver in the launching aircraft and would be made to coincide with the next pulse of the illuminating radar by varying a suitable delay preceding the transmission of the semidirective radar concerned. The tracking gates for this action would have a point of tracking balance coinciding with the radar transmitter pulse, the gates being timed by the master oscillator and trigger generating circuits of that radar. The tracking corrections would vary the suitable delay of the following synchronizing pulse of the semidirective radar in such a way that the proper time was left in the following cycle for the pulse to travel to the particular missile concerned and then back to the launching aircraft. The suitable delay would therefore be automatically varied from the full cycle, $t$, at the instant of launching to a shorter time, $$t - \frac{2X}{c}$$

(where $c$ is the velocity of light), as the distance from the missile to the launching aircraft, $X$, is increased. Using this technique with two or more missiles, the synchronizing pulses for the various missiles would leave the launching aircraft at various times depending on the distance to the missile concerned, but the returning pulses from the missiles would arrive at the launching aircraft in coincidence. Thus the transmitter pulse of the illuminating radar in the launching aircraft would serve its function of helping complete the primary and secondary paths of all the missiles simultaneously.

Each missile will begin the measurement of the lengths of its own primary and secondary paths at the instant the transmitter in the tail of that missile returns the synchronizing pulse to the launching aircraft. This instant would precede the start of the next radar cycle of the missile system by a time equivalent to the distance, $X$, between that missile and the launching aircraft. The firing of the illuminating radar in the aircraft and the return of the ensuing echo from the target to the missile would complete the primary path $X+Y+Z$. The return of the echo from the target to the launching aircraft and a second firing of the proper semidirective radar there would complete the secondary path $X+Y+Y+X$ back to the receiver in the tail of the missile. The missile would now measure the difference between twice the primary path length, equal to $2(X+Y+Z)$, and the secondary path $2(X+Y)$ to find the true radar range $2Z$ from that missile to the target. The time interval for the radar pulse to travel the distance $2Z$ or the radar transit time between transmission and reception of the radio wave reflected from a target is proportional to actual range or distance from the target and is commonly known in the art as "radar range."

One object of the present invention is to provide a semiactive or semiactive to active missile system having a maximum range with optimum accuracy and capable of handling two or more missiles simultaneously from a launching aircraft.

Another object of the present invention is to provide a means for synchronization of pulse radars between a launching device and a plurality of radar homing missiles in such a way that the homing missile's radar may be semiactive in character during the entire flight or alternatively semiactive during the initial portion of the flight and yet active and capable of accurate range measurement during a subsequent portion of the flight at close range.

Still another object of the present invention is to provide a system for synchronization and accurate range measurement which is operative for greater ranges than an active missile system of comparable size and yet substantially retains the accuracy of an active system.

A further object of the present invention is to provide a system of range measurement utilizing the measurement of three sides to solve a triangle wherein the third side is found by measuring the time between two pulses at the missile rather than by the addition and subtraction of signals representing the lengths of triangle sides involved to provide the optimum accuracy in range measurement.

A still further object of this invention is to provide a system for synchronization and range measurement with a plurality of guided missiles launched from a single aircraft or station and wherein a single directive radar illuminates the target and completes the primary and secondary paths of all the missiles simultaneously.

Other objects and many of the attendant advantages of this invention will be readily appreciated as the same becomes better understood by reference to the following detailed description when considered in connection with the accompanying drawings wherein:

FIGURE 1 is a schematic view illustrating one preferred form of the present invention;

FIGURE 2 is the pulse timing diagram of one of the missiles;

FIGURE 3 is a pulse timing diagram of another missile correlated to FIGURE 2;

Figure 4:
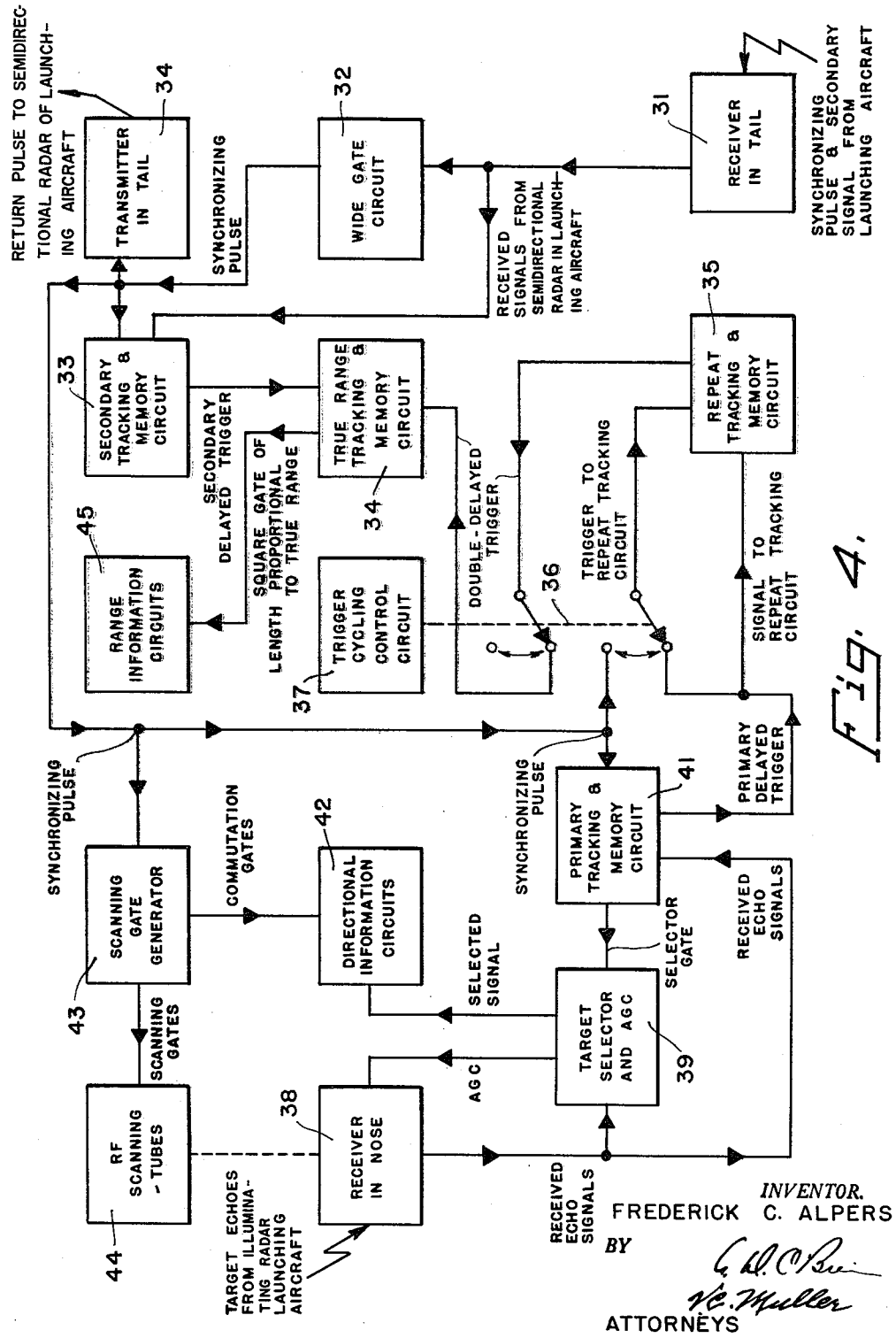
FIGURE 4 is a block diagram of the missile portion of the system of the present invention.

Referring now to the drawings in detail, a plurality of missiles, such as the missiles 10 and 11, are controlled from the launching aircraft 12 during all or a portion of their flight toward the target 13, as illustrated in the schematic drawing of FIGURE 1.

In the system of the present invention the launching aircraft 12 has a highly directive radar 14 and a plurality of semi-directive radars such as those indicated at 15 and 16, one for each of the missiles such as 10 and 11. In this system, in contrast with the systems illustrated in the copending applications of F. C. Alpers mentioned supra, the synchronizing pulse to each of the missiles originates in the radars 15 and 16 of the launching aircraft with a suitable time delay in each case relative to the trigger pulse originating in radar 14. Each of semi-directive radars 15 and 16 would be tuned to the radar frequency of the tail transmitter and receiver of a particular missile and each would have a tracking circuit associated with it. The radar 14 in the launching aircraft would require a stable master oscillator and a trigger generating circuit to trigger it.

The cycle for the plural missile system would begin with the pulse transmitted from radar 14 in the launching aircraft 12 and this pulse would be repeated at an even stable repetition frequency in order that delays begun in one cycle might be carried over to the beginning of the next without encountering jitter problems. After a suitable delay following the illuminating radar pulse, each of semi-directive radars 15 and 16, in the launching aircraft 12, will transmit a synchronizing pulse to the receiver in the tail of the corresponding missile along the path $S_1$ or $S_2$. This receiver would then trigger the transmitter in the tail of that missile sending a signal back to the semi-directive radar in the launching aircraft in the manner of a transponder along the path $X_1$ or $X_2$.

The returning signal from the missile would be tracked by the corresponding semi-directive radar receiver in the launching aircraft and would be made to coincide with the next pulse of the illuminating radar 14 by varying the suitable delay preceding the transmission of the semi-directive radar concerned. The tracking gates for this action would have a point of tracking balance coinciding with the illuminating radar transmitted pulse, the gates being timed by the master oscillator and trigger generating circuits of that radar. The tracking corrections would vary the suitable delay of the following synchronizing pulse of the semi-directive radar in such a way that the proper time is left in the following cycle for the pulse to travel to the particular missile concerned and then back to the launching aircraft. The suitable delay would therefore be automatically varied from one full cycle T at the instant of launching to a shorter time $$T - \frac{2X}{C}$$

where C is the velocity of light, as the distance from the missile to the launching aircraft (X) is increased.

Using this technique with a plurality of missiles the synchronizing pulses of the various missiles would leave the launching aircraft at various times depending upon the distance to the missile concerned, but the returning pulses from the missiles would arrive at the launching aircraft in coincidence. Thus the transmitter pulse of the illuminating radar 14 in the launching aircraft would serve its function of helping to complete the primary and secondary paths of all the missiles simultaneously.

Each missile would begin the measurement of the lengths of its own primary and secondary paths at the instant the transmitter in the tail of that missile returned the synchronizing pulse to the launching aircraft 12. This instant would precede the start of the next radar cycle of the whole missile system by a time equivalent to the distance X between that missile and the launching aircraft. Firing of the illuminating radar in the aircraft and the return of the ensuing echo from the target to the missile would complete the primary path $X+Y+Z$. The return of the echo from the target to the launching aircraft along the path $Y'$ and a second firing of the proper semi-directive radar there would complete the secondary path $X+Y+Y'+X'$ to the receiver in the tail of the missile. The missile would now measure the difference between twice the primary path length and the secondary path to find the true radar range 2Z from that particular missile to the target 13.

The pulse diagrams of FIGS. 2 and 3 illustrate the sequence of pulses in the system with respect to the two missiles 10 and 11 wherein the cycle begins with the pulse transmitted from radar 14 in the launching aircraft 12 which pulse is not illustrated in FIG. 2, and after a suitable delay which varies with each missile a synchronizing pulse such as the pulse 17, is sent out by radar 16 along the path $S_1$ to the missile 10. This receiver would then trigger the transmitter in the tail of the missile 10 sending a signal consisting of the pulse 18 back along the path $X_1$ to radar 16. The returning signal from the missile will be tracked by the receiver of the radar 16 and will be made to coincide with the next pulse of the illuminating radar. At the same instant that the pulse from the missile 10 is received by radar 16, the radar pulse from radar 14 is transmitted along the path Y towards the target 13 and the echo pulse from the target 13 follows the path $Z_1$ back to the receiver in the nose of the missile 10 to provide the echo pulse 21 received along the primary path. Another echo signal from the target 13 will return along the path $Y'$, will be received by the receiver of radar 14 in the launching aircraft 12 and the pulse will be transmitted through radar 16 and received by the receiver in the tail of the missile 10 along the path $X_1'$ to provide the pulse 22. Suitable circuitry within the missile 10 will provide a pulse 23 at a time equal to twice the time required for the signal to traverse the primary path.

The action of radar 15 is similar to that of radar 16 and it also sends a pulse 24 along a path $S_2$ to the missile 11, where a pulse 25 originates the return signal along the path $X_2$, the returning pulse being received by the radar 15 in coincidence with the pulse 26 of radar 14 which, as previously indicated, goes out along the path Y to the target 13. The primary echo signal returns to the missile 11 along the primary path $Z_2$ and the other echo pulse returns along the path Y' to the receiver of radar 14 initiating the pulse from radar 15 following the path $X_2'$ to be received by the missile 11 as a pulse 28. The missile 11 similarly generates a pulse 29 at an interval which is twice the primary path to complete the cycle with respect to this missile.

It will be apparent that any number of missiles can be utilized with the system of the present invention and that each of the semidirective radars 15 and 16 will necessarily be tuned to a different frequency and the receiver and transmitter in the tail of the corresponding missile will be tuned to the same frequency but a different frequency than that of each of the other missiles.

Referring now to the block diagram of FIGURE 4 which illustrates the missile portion of the plural missile system of the present invention, the receiver 31 in the tail of the missile receives a synchronizing pulse from the corresponding semidirective radar in the launching aircraft which is transmitted to the wide gate circuit 32 and to the secondary tracking and memory circuit 33. The wide gate excluder circuit 32 provides a selective coupling which is adapted to pass the synchronizing pulse but excludes the secondary signal from the launching aircraft which occurs at a later time.

The synchronizing pulse from the wide gate circuit 32 is sent to both the transmitter in the tail of the missile 34 and to the secondary tracking and memory circuit 33. The transmitter 34 sends out the return pulse to the semidirective radar on the launching aircraft. The secondary tracking and memory circuit 33 sends out a secondary delayed trigger to the true range tracking and memory circuit 35. The synchronizing pulse from the wide gate circuit 32 is also sent to the repeat tracking and memory circuit 35 through the switch 36 which is controlled by the trigger cycling control circuit 37.

A target echo from the radar pulse sent out by the radar 14 and reflected from the target 13 is received by the receiver 38 in the nose of the missile which transmits the received echo signals to the target selector and AGC circuit 39 and also to the primary tracking and memory circuit 41. The selector gate from the primary tracking and memory circuit 41 also goes to the target selector and AGC 39 which sends out an AGC signal to the receiver 38 and a selected signal to the directional information circuits 42.

The synchronizing pulse from the wide gate circuit 32 also goes to the scanning gate generator 43 which sends out scanning gates to the RF scanning tubes 44 and the commutation gates to the directional information circuits 42.

A primary delayed trigger from the primary tracking and memory circuit 41 goes to the repeat tracking and memory circuit 35 which generates the double delayed trigger which is sent to the true range tracking and memory circuit 34 which in turn generates a square gate of length proportional to true range which is sent to the range information circuits 45.

Figure 5:
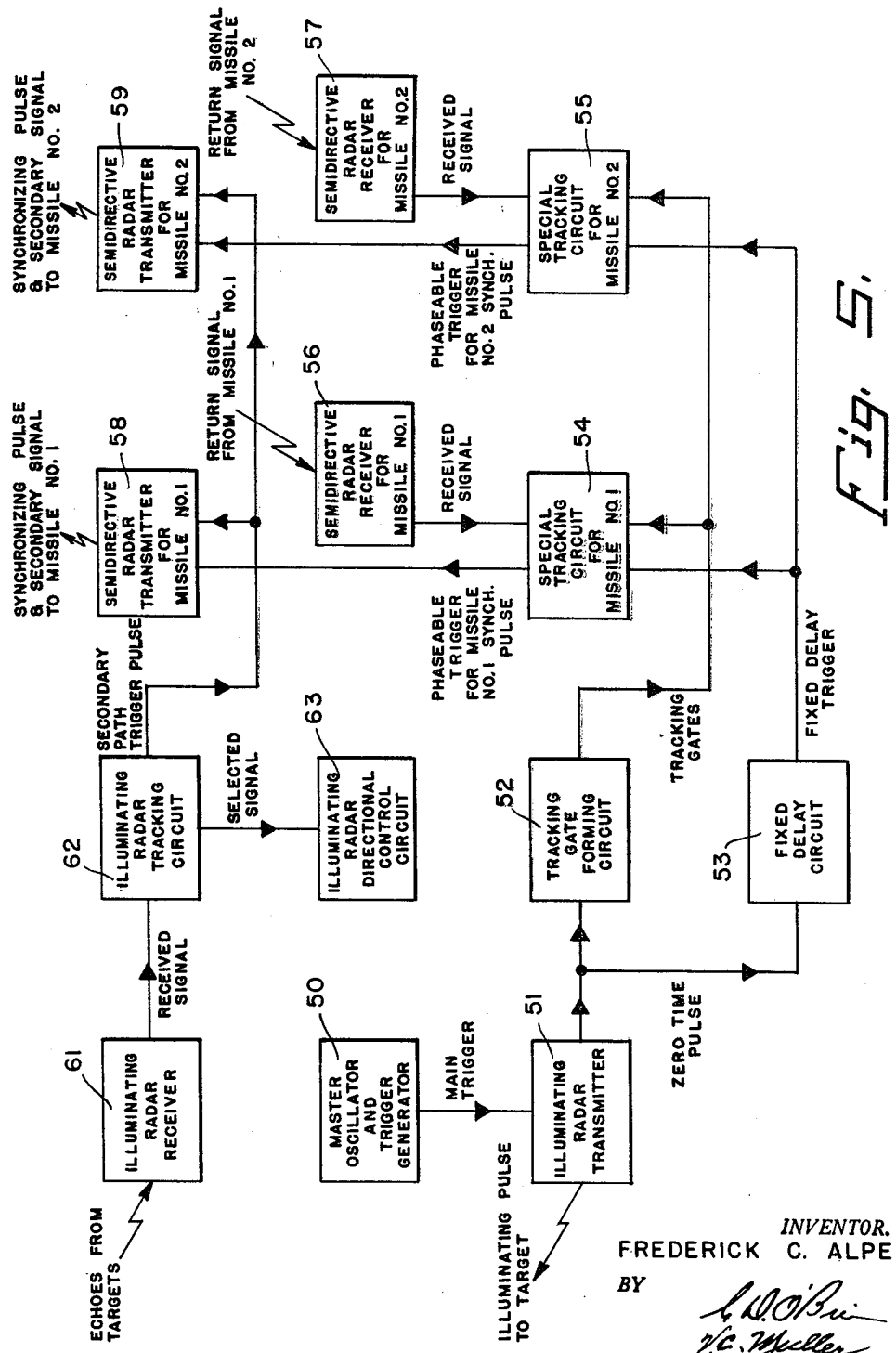
FIGURE 5 is a block diagram of the launching aircraft portion of the system of the present invention.

Referring now to FIG. 5 wherein is illustrated a block diagram of the launching aircraft portion of the present invention, the master oscillator and trigger generator 50 sends the main trigger to the transmitter 51 of radar 14 on the launching aircraft which sends out a highly directive radar pulse to illuminate the target 13. The transmitter 51 also transmits a zero time pulse to the tracking gate forming circuit 52 and also to a fixed delay circuit 53 which sends out a fixed delay trigger to each of the special tracking circuits such as 54 and 55 for the missiles 10 and 11. The fixed delay provides for operation of the special tracking circuits beginning at zero range.

The tracking circuits 54 and 55 also receive the tracking gates from the tracking gate forming circuit 52 and the received signal from the receivers 56 and 57 for radars 15 and 16 which receive the return signal from the missiles 10 and 11. A phaseable trigger for each of the missiles goes from the special tracking circuits 54 and 55 to the transmitters 58 and 59 for the radars 15 and 16 which in turn send out the synchronizing pulses such as 17 and 24 to the missiles 10 and 11. The echo from the target along the secondary path is received by the receiver 61 for the radar 14 and is sent to the illuminating radar tracking circuit 62 which sends the secondary path trigger pulse to each of the transmitters 58 and 59 and also sends a selected signal to the radar directional control circuit 63.

*Operation*

In the operation of the system in detail as illustrated in FIG. 4 and FIG. 5 in block diagram form, the main trigger from the master oscillator and trigger generator 50 actuates radar transmitter 51 which sends out an illuminating pulse to the target and also sends a zero time pulse to the tracking gate forming circuits and the fixed delay circuit, the latter in turn sending out a fixed delay trigger to each of the special tracking circuits 54 and 55 for the missiles 10 and 11. The tracking circuits 54 and 55 each send out a phaseable trigger which actuate the transmitters 58 and 59 to send out the synchronizing pulses such as 17 and 24 to the missiles 10 and 11.

The synchronizing pulse is received by the receiver 31 in the tail of the missile which sends the signal to the wide gate circuit 32 where the synchronizing pulse in turn is sent to the transmitter 34 in the tail of the missile. Each missile sends out a return pulse along the paths $X_2$ and $X_1$ to the receivers 56 and 57 of the radars 15 and 16 on the launching aircraft 12.

At this time another pulse is transmitted from the transmitter 51 of radar 14 along the path Y towards the target 13. The echo pulse reflected from the target 13 along the primary paths $Z_1$ and $Z_2$ go to the receiver 38 in the nose of each of the missiles 10 and 11 where the received echo signals are transmitted to the target selector and AGC circuit and also to the primary tracking and memory circuit 41, which also receives a synchronizing pulse from the wide gate circuit 32 to generate a primary delayed trigger such as 21 and 27 which is transmitted to the tracking and memory circuit which generates a double delayed trigger such as 23 and 29 which goes to the true range tracking and memory circuit 34.

Another echo signal from the target 13 follows the path Y' back to the receiver 61 in the radar 14 on the launching aircraft 12, where the received signal goes to the radar tracking circuit 62. A secondary path trigger pulse is sent to the transmitters 58 and 59 of radars 15 and 16 which send the secondary signal along the paths $X_1'$ and $X_2'$ to the receiver 31 in the tail of the missile. The secondary signal goes to the secondary tracking and memory circuit 33 where a secondary delayed trigger is generated and sent to the true range tracking and memory circuit. By comparing the secondary delayed trigger with the double delayed trigger the true range tracking and memory circuit generates a square gate of length proportional to the true range which is transmitted to the range information circuit 45 as illustrated in the pulse diagrams in FIGS. 2 and 3. The range information circuits 45 in conjunction with the directional information circuits 42 may be utilized for guidance of the missile or any other functions desired.

It will be apparent that the present system which illustrates a plurality of missiles of the semiactive type utilized in conjunction with a single launching aircraft could also be modified by changing the missile portion of the system for semiactive to active operation as disclosed in the copending application of F. C. Alpers, Serial No. 528,143, filed August 12, 1955 noted supra.

A self-synchronous tracking circuit could also be utilized in place of the wide gate circuit 32 for selectively passing the synchronizing pulse but excluding the secondary signal received by the receiver 31 in the tail of the missile.

Since the system of the present invention and those disclosed in the copending applications of F. C. Alpers do not require motion of the launching aircraft, the systems will function with equal effectiveness with ground or ship based radars in place of the radars in the launching aircraft.

Also, since the system is not necessarily contingent upon use of a pilotless missile, a piloted aircraft may be substituted for the missile and range information could be obtained in the same manner. Thus the system would be useful in helping to direct a group of fighter bombers against a battlefield target in tactical support of ground fighting.

Obviously many modifications and variations of the present invention are possible in the light of the above teachings. It is therefore to be understood that within the scope of the appended claims the invention may be practiced otherwise than as specifically described.

What is claimed is:

1. A system for synchronization and range measurement with a plurality of guided missiles comprising, a launching device, means on the launching device for transmitting a synchronizing pulse to each of the missiles, means on each of said missiles for receiving the synchronizing pulse and transmitting a return pulse toward the launching device, means on the launching device for transmitting an illuminating pulse toward a target in response to said return pulse, means on each of said missiles for receiving an echo signal directly from said target, means on said launching device for receiving an echo signal of said illuminating pulse from said target and relaying said echo signal to each of said missiles, and means on each of said missiles for comparing the time for said return pulse to travel to the launching device plus the time for said illuminating pulse to travel to said target plus the time for an echo of said illuminating pulse to travel from the target to said missile, with the time for said return pulse to travel to the launching device plus the time for said illuminating pulse to travel to said target, to generate an output signal proportional to the range between the missile and the target.

2. A system for synchronization and range measurement with a plurality of guided missiles comprising, a launching device, means on the launching device for transmitting a synchronizing pulse to each of the missiles, means on each of said missiles for receiving the synchronizing pulse and transmitting a return pulse toward the launching device, means on the launching device for transmitting an illuminating pulse toward a target in response to said return pulse, means on each of said missiles for receiving an echo signal directly from said target, means on said launching device for receiving an echo signal from said target and relaying said echo signal to each of said missiles, and means on each of said missiles for generating a pulse of a duration equal to twice the sum of the times required for said return pulse to travel to the launching device and said illuminating pulse to travel to said target and the reflected echo signal to travel to the missile, means on each of said missiles for generating a pulse of a duration equal to twice the sums of the time required for said return pulse to travel to the launching device and said illuminating pulse to travel to said target, and means responsive to the last two mentioned pulses for generating a square gate signal which has a length proportional to the range between the particular missile and the target.

3. A system for synchronization and range measurement with a plurality of guided missiles comprising, a launching device, means on the launching device for generating a zero time pulse, means responsive to said zero time pulse for transmitting an illuminating pulse toward the target and after a certain delay transmiting a synchronizing pulse to each of the missiles, means on each of said missiles for receiving the synchronizing pulse and transmitting a return pulse toward the launching device, means for determining and introducing said certain delay for each missile so that said return pulse from each missile arrives at the launching device substantially coincident with the transmittal of the next one of said illuminating pulses, means on each of said missiles for receiving an echo signal directly from said target, means on said launching device for receiving an echo signal from said target and relaying said echo signal to each of said missiles, means on each of said missiles for generating a pulse at an interval equal to twice the sum of the times required for said return pulse to travel to the launching device and said illuminating pulse to travel to said target and the reflected echo signal to travel to the missile, means on each of said missiles for generating a pulse of a duration equal to twice the sum of the times required for sai dreturn pulse to travel to the launching device and said illuminating pulse to travel to said target, and means responsive to the last two mentioned pulses for generating a square gate signal which has a length proportional to the range between the particular missile and the target.

4. A system for synchronization and range measurement with a plurality of guided missiles comprising a launching device having a first radar transmitter and receiver and a plurality of other radar transmitters and receivers, a plurality of guided missiles each having a radar transmitter and receiver mounted in the tail thereof and a radar receiver mounted in the nose thereof, means on said launching device for generating a main trigger and applying said trigger to said first radar transmitter, said first radar transmitter being adapted to send out an illuminating pulse in the direction of a target in response to said trigger, means on said launching device for each of said missiles adapted to receive a trigger pulse and signals from said other radar receivers and send a suitable delayed trigger to one of said other transmitters for sending out a synchronizing pulse to one of said plurality of missiles, means on said missile for selectively passing said synchronizing pulse to the transmitter in the tail thereof, means coupled to the receiver in the nose of the missile for generating a first delayed trigger pulse in response to an echo signal received from the target, means coupled to said first delayed trigger pulse generating means for generating a double delayed trigger pulse, said other radar transmitters being coupled to said first radar receiver for transmitting a signal to each of said missiles in response to a received echo signal by said first radar receiver from the target, means in the tail of the missiles for generating a second delayed signal in response to the last mentioned transmitted signal, and means coupled to said double delayed trigger pulse generating means and to said second delayed trigger pulse generating means for generating a square gate of length proportional to the range between the target and the missile.

5. A system for synchronization and range measurement with a plurality of guided missiles comprising a launching device having a first radar transmitter and receiver and a plurality of other radar transmitters and receivers, a plurality of guide missiles each having a radar transmitter and receiver mounted in the tail thereof and a receiver mounted in the nose thereof, means including a master oscillator and trigger generator on said launching device for generating a main trigger and applying said trigger to said first radar transmitter, said first radar transmitter being adapted to send out illuminating pulses to the target and to send out zero time pulses, a tracking circuit on said launching device for tracking one of said missiles and adapted to receive said zero time pulses and signals from one of said other radar receivers for generating a delayed trigger, one of said other radar transmitters being coupled to said tracking circuit for sending out a synchronizing pulse to said one of said missiles, means on said one of said missiles for selectively passing said synchronizing pulse to the transmitter in the tail thereof and initiate a return signal, said delayed trigger being timed for arrival in coincidence with the next main trigger at said launching device, a tracking and memory circuit coupled to the radar receiver in the nose of one of said plurality of missiles for receiving echo signals from the radar receiver in the nose of the missile and generating a second delayed trigger, means including a repeat tracking and memory circuit coupled to said tracking and memory circuit for generating a double delayed trigger from said second delayed trigger, said first radar receiver being coupled to said one of said other radar transmitters for receiving an echo signal from the target and triggering said one of said other radar transmitters to transmit a signal to each of said missiles, means including a second tracking and memory circuit coupled to the receiver in the tail of said one of said plurality of guided missiles for generating a third delayed trigger in response to the signal received from said one of said other radar transmitters, means including a third tracking and memory circuit coupled to said double delayed trigger generating means and to said third delayed trigger generating means for generating a square gate of length proportional to the difference in time duration of said double delayed trigger and said third delayed trigger which represents the range between the target and the missile.

References Cited in the file of this patent

UNITED STATES PATENTS

| | | |
|---|---|---|
| 2,746,034 | Hasbrook | May 15, 1956 |
| 2,891,246 | Reed | June 16, 1959 |